United States Patent [19]

Hamilton et al.

[11] 3,769,568

[45] Oct. 30, 1973

[54] DC-TO-DC CONVERTER HAVING SOFT START AND OTHER REGULATION FEATURES EMPLOYING PRIORITY OF PULSE FEEDBACK

[75] Inventors: Billy Harold Hamilton, Summit; Frederick Francis Kunzinger; Robert Edward Schroeder, both of Parsippany, all of N.J.

[73] Assignee: Bell Telephone Laboratories, Incorporated, Murray Hill, N.J.

[22] Filed: July 31, 1972

[21] Appl. No.: 276,709

[52] U.S. Cl. .................... 321/2, 321/19, 321/45 S
[51] Int. Cl. ........................................... H02m 3/32
[58] Field of Search ..................... 321/2, 19, 45 R

[56] References Cited
UNITED STATES PATENTS

| | | | |
|---|---|---|---|
| 3,355,653 | 11/1967 | Paradissis | 321/19 X |
| 3,413,538 | 11/1968 | Hodges | 321/2 |
| 3,437,905 | 4/1969 | Healey et al. | 321/19 |
| 3,461,374 | 8/1969 | Rhyne, Jr. | 321/19 X |
| 3,480,852 | 11/1969 | Hung | 321/19 X |
| 3,564,384 | 2/1971 | Adler | 321/2 |
| 3,566,245 | 2/1971 | Blokker et al. | 321/19 X |
| 3,609,507 | 9/1971 | Beck | 321/19 X |
| 3,733,540 | 5/1973 | Hawkins | 321/45 S X |

*Primary Examiner*—William M. Shoop, Jr.
*Attorney*—W. L. Keefauver

[57] ABSTRACT

There is disclosed a dc-to-dc converter provided with dual-mode current and voltage regulation and a "soft" start characteristic in which a digital-type feedback control is obtained based upon the relative priority of the arrival of the respective feedback pulses at the driving circuit for the converter transistors. In addition, a shut-down circuit checks both of two redundant feedback circuits for the absence of feedback pulses for a prescribed time before triggering shut-down. Either of the two redundant feedback circuits is individually capable of regulating the output voltage or the output current if the output load is balanced. With a high impedance unbalanced load, the voltage regulator on the output lead that tends to experience high voltage takes control and limits the maximum output voltage.

8 Claims, 4 Drawing Figures

DC-TO-DC CONVERTER HAVING SOFT START AND OTHER REGULATION FEATURES EMPLOYING PRIORITY OF PULSE FEEDBACK

BACKGROUND OF THE INVENTION

This invention relates to the regulation of output current and voltage of a dc-to-dc converter circuit and particularly to the application of digital regulation techniques to such circuits.

The application of digital techniques to power supply circuitry is becoming increasingly desirable in view of the compatibility of such digital techniques with integrated circuits of all types. Moreover, the development of digital techniques in power supply circuitry may eventually lead to power supply circuitry which is more readily standardized for a number of different applications than in the past. Indeed, prior art power supplies have been individualized for nearly every application and, sometimes, even for differing values of output voltage or current. Thus, most prior art power supplies have been produced in fairly small quantities for a given design. Each power supply has, therefore, also been of little interest to others in the art with respect to the overall advancement of the art and technology in general.

Accordingly, it is an object of our invention to apply digital regulation techniques to power supply circuitry.

SUMMARY OF THE INVENTION

According to our invention, a dc-to-dc converter employs digital-type feedback control techniques in which feedback pulses are produced with varying time delays responsive to conditions to be controlled; and a transistor inverter circuit within the converter responds only to the first arriving feedback pulse.

According to one subsidiary feature of the invention, feedback pulses are produced with a time delay responsive to an output parameter of the converter; and, in addition, soft start pulses are generated with increasing time delay after the start of operation of the converter. A logic circuit responsive to both sets of pulses passes only the first received one of the pulses to change conduction in the inverter circuit in the sense that controls the value of the output parameter.

According to another feature of the invention, the converter has first and second output lines with an intermediate ground and two feedback circuits including sensors connected in respective halves of the output circuit to supply the feedback pulses, responsive to the respective output parameters, to be controlled in those halves. Since there is only one inverter to be controlled, the two feedback circuits are redundant.

It is an advantage of this invention that the priority of pulse feedback technique is compatible with dual-mode current regulation and voltage regulation and also with the use of inexpensive pulse coupling transformers to isolate the input and output circuits.

It is a further advantage that a shut-down circuit can be provided which checks both of the feedback circuits for the absence of feedback pulses for a prescribed period of time before shutting down the converter.

BRIEF DESCRIPTION OF THE DRAWING

Further features and advantages of our invention will become apparent from the following detailed description taken together with the drawing, in which.

DETAILED DESCRIPTION OF THE ILLUSTRATIVE EMBODIMENT

Figure 1:
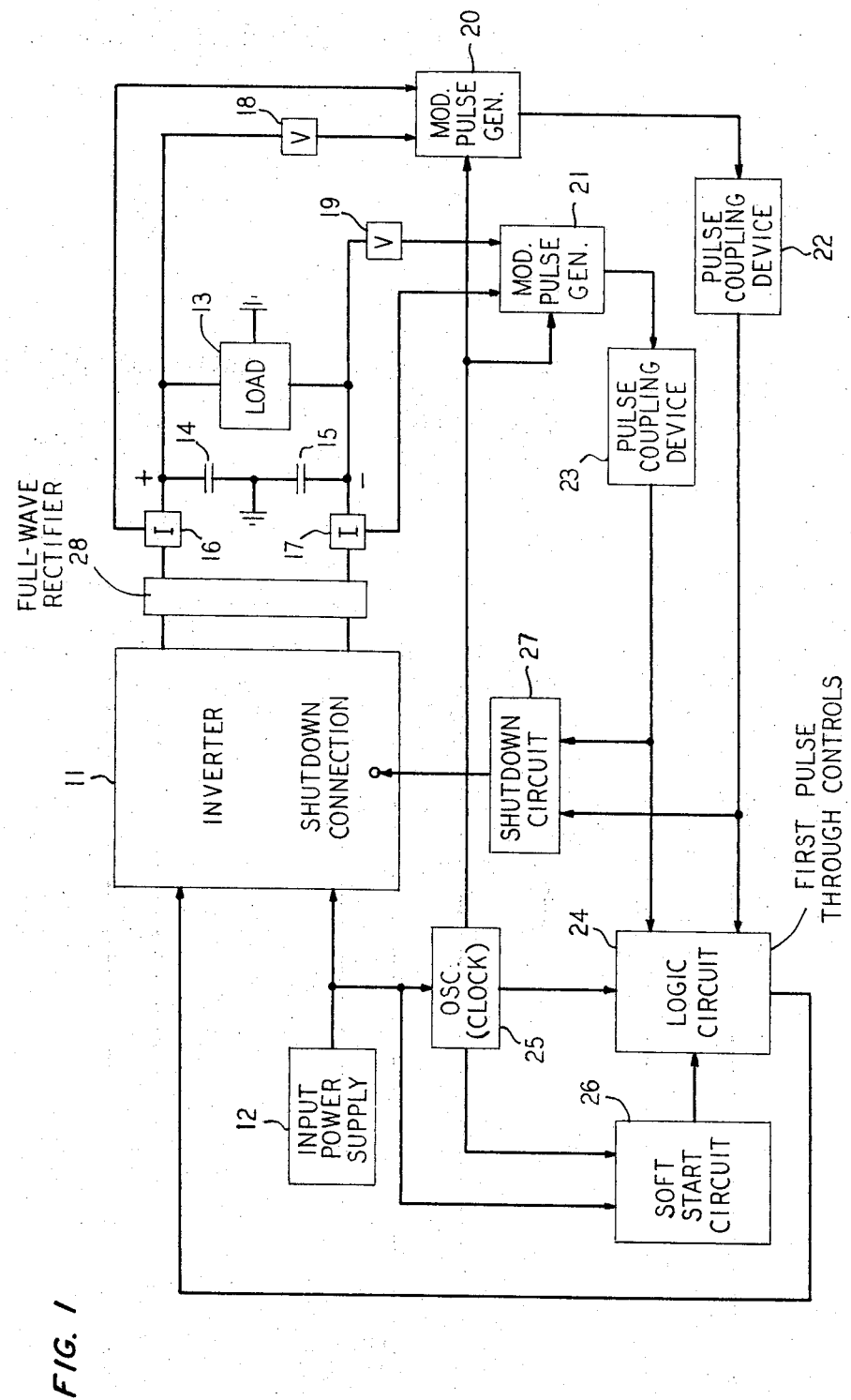
FIG. 1 is a partially schematic and partially block diagrammatic illustration of the preferred embodiment of the invention.

In the dc-to-dc converter circuit of FIG. 1 the input power supply source 12 is coupled to an inverter circuit 11, which supplies power through full-wave rectifier 28 to load 13 under voltage or current conditions differing from those of the supply 12.

The final portion of the output filter, including capacitors 14 and 15 with their common point connected to ground, is shown in order to illustrate the split nature of the output circuit. Current is sensed in each of the output lines by current sensing means 16 and 17 in the positive and negative lines, respectively. Current sensor 16 and voltage sensor 18 are coupled to a modulated pulse generator 20 in the first of two feedback loops. Current sensor 17 and voltage sensor 19 are coupled to a modulated pulse generator 21 in a second feedback circuit. The constant frequency oscillator or clock circuit 25 provides inputs to both modulated pulse generators 20 and 21. The separate nature of the feedback circuits is continued by the pulse coupling devices 22 and 23, coupled to the output of generators 20 and 21, respectively. The outputs of pulse coupling devices 22 and 23 are connected to separate inputs of the common logic circuit 24.

It is the basic concept of this invention that the first feedback or other controlled pulse through logic circuit 24 will be effective to control conduction within the inverter 11. Additional control pulses are applied from a soft start circuit 26 which is powered by supply 12 and timed by oscillator circuit 25. The output of circuit 26 is coupled to a third input of logic circuit 24 in which the priority of the soft start pulses is compared with the priority of the feedback pulses.

While logic circuit 24 has a fourth input to which pulses are applied from oscillator 25, it will be seen hereinafter that the pulses from circuit 25 are not subject to the priority scheme of the logic circuit but rather serve to reset the logic circuit so that it is ready to determine priority of control pulses upon the next cycle of operation. It will be seen that whereas the control pulses terminate each half cycle of conduction in inverter 11, the oscillator pulses permit the reinitiation of conduction in inverter 11 at a constant frequency.

The shut-down circuit 27 is coupled to the outputs of both pulse coupling devices 22 and 23, shown as directly but preferably indirectly connected through circuit 24 to centralize the logic functions, and is adapted to shut down inverter 11, as symbolically indicated by the indicated coupling between circuit 27 and a shutdown connection on inverter 11. Shutdown occurs whenever there is an absence of feedback pulses from both of the pulse coupling devices 22 and 23 for more than a preset period of time.

The control pulse from either device 22 or device 23 is effective to control the operation of inverter 11 and to regulate conditions in both halves of the output circuit, even though the feedback pulse is responsive to conditions only in one half of the output circuit.

It should be noted that timing signals are supplied from the oscillator 25 to the modulated pulse generators 20 and 21 so that, in the specific implementation described hereinafter, the feedback pulses coupled to logic circuit 24 in the separate paths through pulse coupling devices 22 and 23 have a time variable offset from their expected times of occurrence in response to variations in the output current and voltage conditions from expected values in the respective halves of the split output. Furnishing the feedback pulses in this particular manner serves a resetting function in the logic circuitry, as will become apparent hereinafter.

It should also be clear from the general diagram of FIG. 1 that the principle of "first pulse through controls," which represents the overall function of logic circuit 24, could be applicable to any number of other feedback pulses or control pulses other than the essentially redundant feedback pulses above described and the soft start pulses above described.

Figure 2:
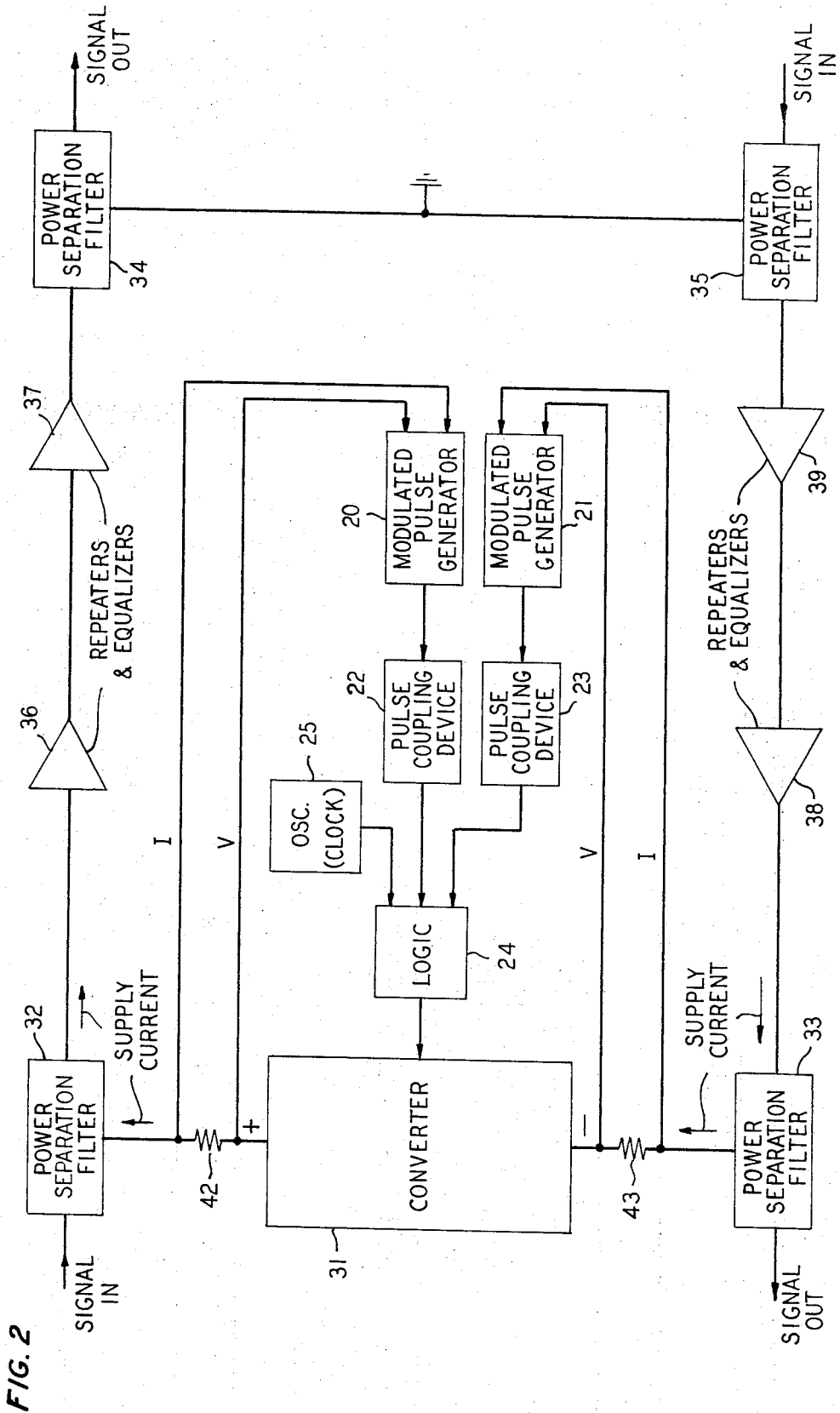
FIG. 2 is a partially schematic and partially block diagrammatic illustration of a typical repeater communication link employing a converter, according to the invention, to supply loads, such as repeaters, serially through the communication line.

The typical utility of a converter, according to the invention, is shown for tutorial purposes in the illustration of FIG. 2. The converter 31 may be essentially of the type shown in FIG. 1, with the load 13 being supplanted by the external circuits connected to the positive and negative terminals of converter 31. This load circuitry includes the power separation filters 32 and 33 and also power separation filters 34 and 35. The load also includes the equalized repeaters 36 and 37 for one transmission direction between power separation filters 32 and 34 and the equalized repeaters 38 and 39 for the other transmission direction between power separation filters 33 and 35.

For completeness, a basic outline of the control circuitry of converter 31 is shown in FIG. 2. It would include the resistors 42 and 43 as parts of current sensors 16 and 17 of FIG. 1, and it would also include the modulated pulse generators 20 and 21, the pulse coupling devices 22 and 23, logic circuit 24 and the oscillator or clock circuit 25, as in FIG. 1. The input power supply is omitted since it is understood to be a part of any complete converter circuit.

The function of the illustration of FIG. 2 is to show the utility of the split ouput of the converter in its application to a typical system. Such two-way, four-wire communication links are well known in the field of long land lines for communication purposes. For this reason, no attempt is made herein to explain the structure or function of the power separation filter and the repeaters which may include active or passive equalization techniques.

If the effective load impedances connected to converter 31 in the two halves of the external circuit are equal, the two feedback regulator circuits are redundant for both current regulation and voltage regulation. The desired output characteristic is achieved if either regulator circuit fails.

Figure 3:
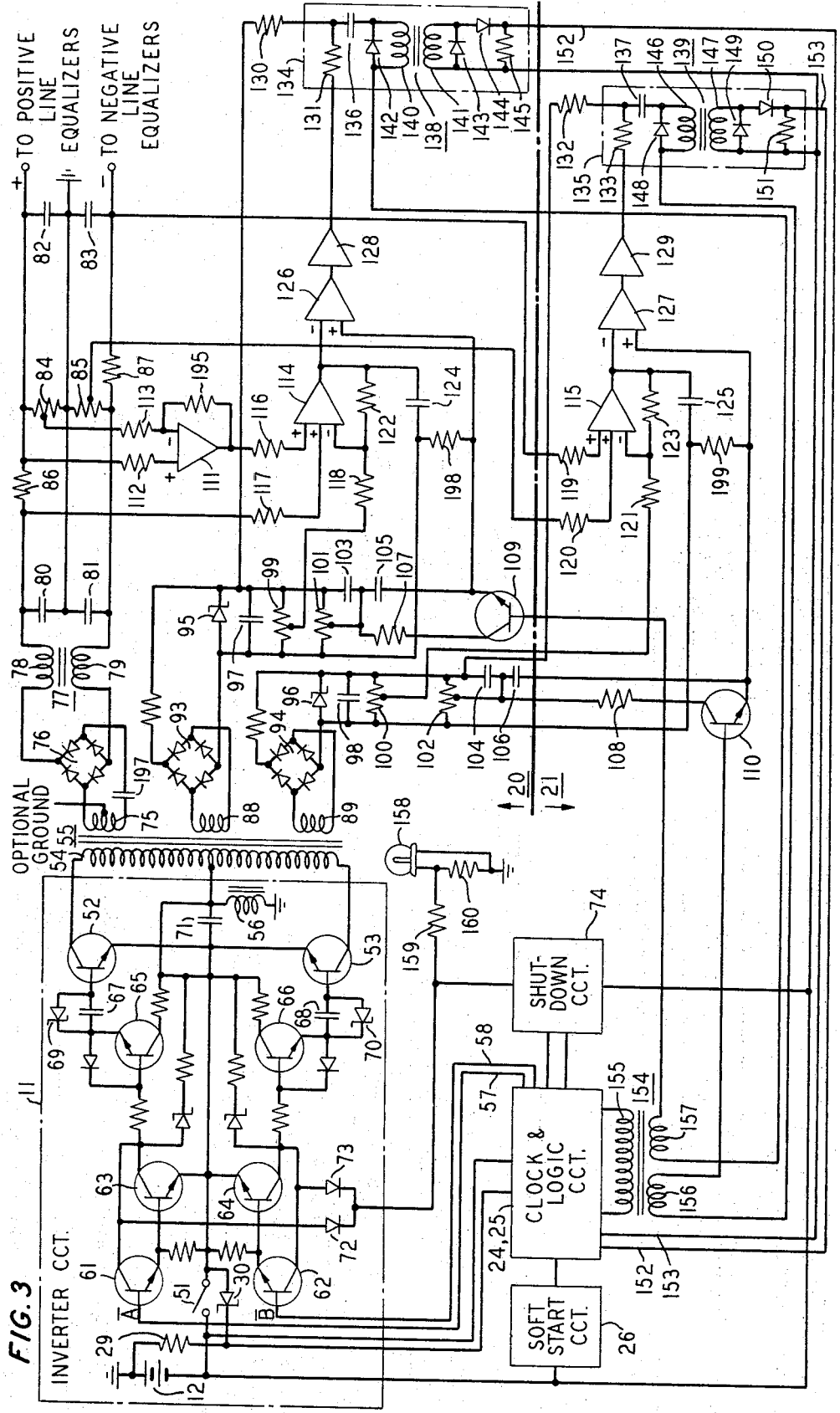
FIG. 3 is a partially schematic and partially block diagrammatic illustration of the preferred embodiment of FIG. 1 in which greater circuit detail of the inverter circuit, output circuit and portions of the feedback circuits are shown.

If the load becomes unbalanced, so that the respective external impedances are unequal, the current regulation is still redundant, if the output winding of inverter 11 is isolated from ground (see FIG. 3). The voltage on the side with the higher load resistance will be the highest voltage to ground. If that higher resistance becomes so large that the voltage across it tends to exceed the maximum desired voltage, the feedback regulator circuit on that side will generate the first pulse and oppose the further increase in voltage.

Although the foregoing is the preferred mode of operation, an alternate mode is feasible and permits the current in one half of the load circuit to be maintained in the event of an open circuit on the other side. This result is achieved by grounding the midpoint of the output winding of the inverter 11. Then, the appropriate feedback regulator would provide current regulation. In the detailed circuitry of FIG. 3, the capacitor 197 would have to be replaced with a straight through connection from winding 75 to permit the unbalanced current flow.

In the more detailed illustration of FIG. 3, specific circuitry to implement the functions described above is shown. This circuitry can best be understood by examining the inverter circuit 11. First, power is supplied from the input battery 12, which is connected in a balanced fashion through the input switch 51 to the emitters of switching transistors 52 and 53, the collectors of which are connected across the primary winding 54 of transformer 55. The dc current path back to the positive terminal of the battery is completed through filter inductor 56. The circuit in which transistors 52 and 53 are included is not an oscillator circuit. Rather, they are turned on in alternation in response to a constant frequency driving signal applied from the clock and logic circuit 24, 25 through leads 57 and 58 to the base electrodes of transistors 61 and 62 in the base driving circuit. Transistors 61 and 62 are connected together with transistors 63 and 64 in Darlington pairs so that adequate current sinking of transistors 63 and 64 is ensured in their ON condition. Likewise, when transistors 61 and 62 are turned off, transistors 63 and 64 are held firmly off and the final driver transistors 65 and 66 are driven into conduction in a fully saturated condition thereby producing a full conduction through transistors 52 and 53. The remainder of the circuitry associated with the transistors for driving the inverters is of a conventional nature. For example, the combinations of capacitors 67 and 68 with Zener diodes 69 and 70 serve to sweep out stored charge in the switching transistors 52 and 53 in a manner which is more fully explained in U.S. Pat. No. 3,304,489 of S. J. Brolin, issued Feb. 14, 1967.

As noted hereinbefore, the transistors 52 and 53 are not turned on simultaneously but rather in alternation. The turn-off time of the switching transistors is made time variable, independently during each half cycle of the operation, in order to achieve the desired control of the output current and voltage values. One last feature of inverter circuit 11 is worth noting. Specifically, the capacitor 71 maintains the dc voltage applied to the switching transistors at an acceptable level at all times, so that when driving transistors 61 through 64 turn off, conduction will automatically be initiated in the appropriate pair of transistors 65 and 52 or 66 and 53. It may also be noted that the inverter circuit 11 may be shut down by simulating the saturated current flow in transistors 61 through 64 simultaneously. This current flow is achieved through the shut-down diodes 72 and 73, the anodes of which are connected to the collectors of transistors 61 and 62, and the cathodes of which are connected in common to the output terminal of shut-down circuit 74. The output is extracted from the inverter through secondary winding 75 of transformer 55 and through the full-wave rectifier 76 and balanced filter section 77 including the mutually coupled filter inductors 78 and 79 and the ouput filter capacitors 80 and 81, the common connection of which is grounded. A filter stage of capacitive filtering is provided by capacitors 82 and 83 in parallel with the output voltage sensing resistors 84 and 85. The positive line current sensing resistor 86 is connected between the positive line terminal of capacitors 80 and 82. The output positive line voltage is sensed between the junction of resistor 84 and the positive terminal of capacitor 82.

The current sensing resistor 87 for the negative line is connected between the noncommon terminals of voltage sensing resistor 85 and filter capacitor 83.

As explained above in reference to FIG. 1, the signals from the output current and voltage sensors, illustratively resistors 84 through 87 in FIG. 3, are fed into a feedback loop including modulated pulse generators 20 and 21 which are separated in FIG. 3 by a relatively heavy horizontal center line and include amplification and comparison functions, as well as pulse-forming functions, performed by the apparatus now to be described. These modulated pulse generators 20 and 21 monitor the output current and line-to-ground voltage on the positive and negative output lines of the converter, respectively.

The first stage of the triple input comparator is an active error amplifier 114, the dc output of which is compared to the timing ramp in the second comparator stage 126.

It will be noted that the output current in the positive line is sensed across resistor 86 and fed via resistor 117 to a first positive signal input of the amplifier section 114 of the triple input comparator circuitry. The positive line-to-ground output voltage is sensed in a negative sense across that portion of resistor 84 between the voltage divider tap and the common terminal of resistors 86 and 84. Therefore, it is inverted by inverter amplifier 111 illustratively including resistors 112 and 113 in its input leads and resistor 195 to set its dc gain. The output of inverter amplifier 111 is fed through resistor 116 to the second positive signal input of comparator amplifier 114. Resistors 112, 113, 195 and 116 proportion the output voltage signal from amplifier 111 so that it may be compared to the same reference voltage as the output current signal which is a voltage appearing at the middle input of comparator amplifier 114. In other words, when both output voltage and current are at the proper values the voltages at the positive inputs of comparator 114 will both be equal to the reference voltage at the negative input thereof.

The reference voltage is derived from a circuit including secondary winding 88 in transformer 55, full-wave rectifier 93 and Zener diode 95, which provides a constant voltage which is filtered by capacitor 97, proportioned appropriately by voltage divider 99 and fed via resistor 118 to the negative reference input of comparator amplifier 114. Comparator amplifier 114 is used as a difference amplifier of the well-known type which amplifies the difference between the reference and the two input signals.

Automatic switch-over from current regulation to voltage regulation occurs when the voltage signal at the upper input of amplifier 114 exceeds the voltage signal at the middle input of amplifier 114.

It is an important and fundamental advantage of this technique, as compared to prior art diode OR gate techniques, that no error is introduced by the switching circuitry, despite its simplicity. It should be recalled that, when diodes are used to switch dc analog voltage signals, a variable amount of error is introduced because of the variation in diode voltage drop with temperature. Amplifier 114 avoids this result. The inputs from the negative line, to triple input comparator amplifier 115, are similarly derived except that no inverting amplifier is needed. It remains to convert the output signal, which appears as a dc level at the output of the amplifier stage 114 or 115 when the respective output line current or voltage is excessive to an output pulse having a time delay inversely related to the amount of over-voltage or over-current.

Specifically, circuitry including transistors 109 in generator 20 and transistor 110 in generator 21 provide a timing ramp voltage synchronized to the oscillator 25 in order to perform this function by means of comparison of the dc output to the ramp voltage in comparators 126 and 127, respectively. The comparators 126 and 127 and the differentiating circuit 130, 131 and 136, described hereinafter, convert the difference between the dc output of comparator amplifiers 114 and 115 and the ramp voltages into a stream of pulses at the same frequency as the ramp voltage with a time delay relative to the start of each cycle of the timing ramp. In essence, the generators 20 and 21 transform an analog error signal into the time domain in the form of appropriate feedback pulses which are coupled to the logic circuit 24 through pulse transformers 134 and 135, and ultimately control the duration of each half cycle of conduction in inverter 11 by terminating conduction in the respective half cycle. The ramp voltage generation circuitry includes, in more detail, voltage dividers 100 and 101 connected across the Zener diode references 96 and 95. The filter capacitors 103 and 104, connected across a portion of the voltage dividers 101 and 100, and the capacitors 105 and 106, which are charged and periodically discharged by transistors 109 and 110 to generate the voltage ramps, are connected to the center point of voltage dividers 100, 101. Specifically, capacitor 105 is connected between the tap of voltage divider 101 and the ramp voltage input of comparator 126 and is charged through resistor 198. The output of amplifier 114 is connected to the filter capacitor 124 and to the negative signal input of comparator 126. Resistor 107 is connected in series with the collector terminal of transistor 109 across capacitor 105. The ramp voltage circuitry in modulated pulse generator 101 is similar to that just described.

The input to the bases of transistors 109 and 110 is a replica of the square wave pulses of clock 25 coupled by the isolating pulse transformer 154 through the secondary windings 157 ad 156. This voltage is sufficient to saturate or cut off either transistor 109 or transistor 110, depending upon the respective half cycle of the inverter that is occurring. It may be seen, in principle, that the ramp voltage circuitry may be designed to operate with any desired polarity.

Illustratively, in FIG. 3 a slow run-down of the voltage ramp applied to the positive input of either comparators 126 or 127 occurs as the capacitor 105 or 106, respectively, starts to recharge after having been previously held in a discharged state by a saturated transistor 109 or 110. Comparators 126 and 127 generate low output until the ramp signal is less than the signal appearing at the negative input. At this point, a substantial output is generated and amplified in buffer amplifiers 128 and 129 and differentiated by the RC circuitry following, including voltage dividers 130, 131 and 132, 133, respectively, capacitors 136, 137, respectively, and the pulse transformers 138 and 139. The differentiated pulse is then applied via lead 152 or 153, respectively, to respective inputs of logic circuit 24.

Figure 4:
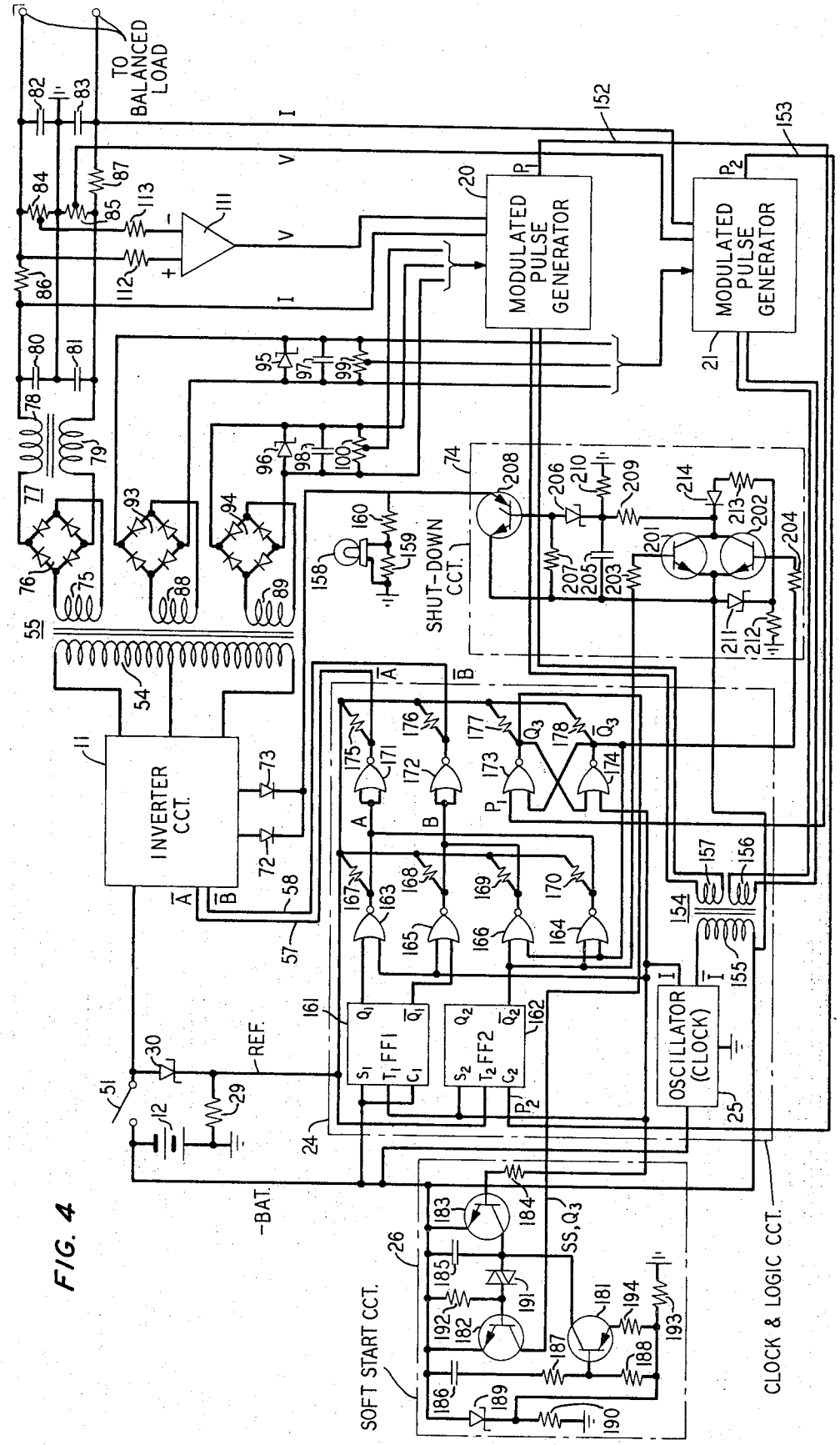
FIG. 4 is a partially schematic and partially block diagrammatic illustration of the preferred embodiment in which the logic circuit, the shut-down circuit and the soft start circuit of the preferred embodiment are shown in greater circuit detail.

The remainder of the feedback control circuitry is shown in FIG. 4. In order to show the bulk of all the circuitry on one sheet, the inverter 11 now shown in block diagram schematic form, as are also the modulated pulse generators 20 and 21, described above.

The logic circuit 24 includes three bistable multivibrator circuits 161, 162 and a third one comprising the cross-coupled NOR gates 173 and 174. The multivibrators 161 and 162 are essentially similar and are of the type well known in the art. They are provided with various inputs at terminals $S_1$, $C_1$ and $T_1$ and S2, T2 and C2. Of significance to their operation is the connection of the quasi-rectangular squarewave output of oscillator 25 to input terminal $T_1$ of multivibrator 161 and to input terminal S2 of multivibrator 162. In the former case, the $Q_1$ output signal changes state when the input signal at terminal $TT_1$ changes from a "1" to a "0." Therefore, multivibrator 161 divides the frequency of input pulses by two.

Similarly, in normal operation the multivibrator 162 gets an input pulse from oscillator 25 once during each cycle of the oscillator and some time during that cycle receives a feedback pulse, designated $P_2$, at input terminal $C_2$. In response to these two input pulses, multivibrator 162 generates a "1" output pulse at output signal terminal $\overline{Q_2}$ until it is reset by oscillator 25. One side of the inverter circuit 11 is ultimately controlled by a four-input NOR gate including the NOR gates 163 and 164 which generate a "1" signal, A, when all four inputs are "0." Similarly, the other half cycle of the inverter circuit is controlled in response to another four-input NOR gate including the NOR gates 165 and 166 which generate an output signal B which is "1" when all four inputs are "0." The first four inputs above mentioned are $Q_1$, $\overline{Q_2}$ and a feedback signal $\overline{Q_3}$ from the third multivibrator plus the principal signal herein designated I from oscillator 25. The second set of four inputs mentioned above comprise the same inputs except that $\overline{Q_1}$ is substituted for $Q_1$. Whenever $Q_1$ is "1," $\overline{Q_1}$ is "0" and whenever $Q_1$ is "0," $\overline{Q_1}$ is "1." All of the NOR gates just described receive appropriate biases through resistors 167 through 170 and 175 through 178 from source Zener diode 30 as shown. NOR gates 171 and 172 invert the A and B signals, respectively, producing thereby signals that are designated $\overline{A}$ and $\overline{B}$ which are fed via leads 57 and 58 into the inverter 11 to drive the responsive halves of the circuit. Specifically, the presence of "1" signals on these leads are effected to shut off conduction in the respective halves of inverter 11. The third multivibrator including NOR gates 173 and 174 responds not only to the output I of oscillator 25 but also to the feedback signal $P_1$ of modulated pulse generator 20. The other input of each of these two NOR gates is the output of the other. The phase or mode of operation may be followed by considering that the signal $\overline{Q_3}$ is "0" until a pulse $P_1$ that is "1" appears. Similarly, the phase or mode of operation of multivibrator 162 may be followed starting from the premise that $Q_2$ is "0" until a feedback pulse $P_2$ that is "1" appears. Therefore, if there are no feedback pulses $P_1$ or $P_2$ that are "1" then the output signal A from NOR gates 163 and 164 is a square-wave type signal which is "1" only on alternate cycles when the oscillator output I is "0." The signal B from NOR gates 165 and 166 is the same as A only shifted by one cycle of oscillator 25.

With the foregoing set of conditions for the operation of circuit 24 it may now be verified that the operation of the multivibrator including NOR gates 173 and 174 may be described as follows: When $P_1$ is "0," $\overline{Q_3}$ is always "0." When $P_1$ switches to "1" and I is "0," the output $\overline{Q_3}$ switches to "1" and remains in that state until I switches to "1." Whenever I is "1," $\overline{Q_3}$ is always "0." Therefore, when a feedback pulse $P_1$ occurs $\overline{Q_3}$ becomes "1" and either A or B, whichever was "1" switches to "0." Note that whenever a pulse $P_1$ occurs, the $Q_3$ output switches to the "0" state. This causes the signals A or B, whichever was non-zero, to switch to the "0" state. Therefore, one of the signals $\overline{A}$ or $\overline{B}$ becomes "1" and drives the inverter circuit 11 to terminate conduction at the half cycle of operation that is appearing at the time.

During the initial start of the converter, the inverter transistors would become severely overloaded if the output filter capacitors 80 through 83 were charged too rapidly. Nevertheless, no feedback pulses $P_1$ or $P_2$ occur to terminate conduction in the inverter until these capacitors are charged sufficiently to allow proper bias to appear on modulators 20, 21. To reduce the stress on the inverter circuit, the soft start circuit 26 provides periodic pulses after the initial closing of switch 51 to simulate the effect of feedback pulses on logic circuit 24. It is in the supplying of the output pulses from circuit 26 that we see the principle of operation of circuit 24 that the first pulse through controls the operation of inverter 11 is again utilized as it was used with respect to the feedback pulses from both modulators. Basically, the soft start circuit 26 provides a pulse at the collector of transistor 182 which is connected to the $Q_3$ output of NOR gate 173 and drives it to the "0" state whenever transistor 182 saturates. As just described above, this "0" state of $Q_3$ terminates a half cycle of conduction in inverter 11. The soft start circuit is timed from oscillator 25 via the signal I applied through resistors 184 to the base of transistor 183 which serves to discharge capacitor 185. If the voltage on capacitor 185 has not reached a value exceeding the drop across the varistor 191 plus the base emitter drop of transistor 182, then conducting resistor 192 keeps transistor 182 off; and the soft start circuit has no effect on the duty cycle of signals A or B. But, whenever capacitor 185 has time to charge to this value, transistor 182 saturates; the signal A or B becomes "0;" and, as explained above, a half cycle of conduction in inverter 11 is terminated.

Capacitor 185 is charged by the collector current of transistor 181 which functions as a controlled current source. That value of controlled current through the emitter and collector of transistor 181 is determined by the voltage at the base of transistor 181 connected to the common terminal of resistors 187 and 188, and is inversely proportional to the voltage across capacitor 186 in series with those resistors across the reference voltage Zener diode 189. The voltage across capacitor 186 and the flow of the control current is directly related to the elapsed time from the closing of switch 51. More specifically, the base voltage for control source transistor 181 starts at a smaller value when the voltage on capacitor 186 is "0" and increases exponentially to about ten times that value with an approximate time constant of $(R_{187}+R_{188})(C_{186})$ as capacitor 186 charges. Therefore, the charing current for the capacitor 185 is initially large in the case of initial closure of switch 51 and decreases exponentially. Thus, transistor 181 will be saturated and soft start signals are applied to logic circuit 24 most frequently immediately after the closing of switch 51. The duty cycle of the coverter increases gradually causing the converter output to build up slowly as capacitor 185 takes longer and longer to charge up to its maximum value needed to generate an output pulse to logic circuit 24. Eventually, the output line-to-ground capacitors 80 through 83 are charged sufficiently to bias modulators 20 and 21 in their active region such that pulses $P_1$ or $P_2$ arrive at logic circuit 24 before transistor 182 is saturated to generate a soft start pulse. At that time, then, $Q_3$ will already be in the "0" state and the saturation of transistor 184 will have no effect.

The shut-down circuit 74 monitors the output of both modulated pulse generators 20 and 21, even though not directly by means of the changes they produce in logic circuit 24 and shuts down the inverter 11 if no such feedback pulses are produced and no such changes occur for more than a prescribed period of time. In broadest terms, the transistors 201 and 202 in shutdown circuit 74 comprise a NOR gate, the input signals of which are derived from the $\overline{Q_2}$ signal in logic circuit 24 through resistor 203 and the $\overline{Q_3}$ signal of logic circuit 24 through resistor 204. Illustratively, a controlled bias for the transistors 201 and 202 is derived across a Zener diode 211, which is connected in series with the resistor 212 across the input source 12. This bias is applied between the common emitter and the collector of transistors 201 and 202 via a resistor 213 and diode 214. In the period between conduction states of either transistor 201 or transistor 202, capacitor 205 charges through resistor 213, diode 214 and resistor 209. If it is continued to allow to charge indefinitely, its voltage will eventually exceed the breakdown voltage of Zener diode 206 and will saturate transistor 208, the base of which is connected to the junction of diode 206 and resistor 207. When the controlled current path of transistor 208 is conducting, current flows therethrough and through resistors 159 and 160 turning on shut-down light 158 and also through diodes 72 and 73, which simulate a continuous presence of both signals $\overline{A}$ and $\overline{B}$ and maintain both paths of the inverter circuit turned off, that is nonconductive.

Nevertheless, under normal operation conditions capacitor 205 is not permitted to charge to such a voltage. When either $\overline{Q_2}$ or $\overline{Q_3}$ is in the "1" state, a "1" pulse has occurred at either the $P_1$ or $P_2$ inputs of logic circuit 24 or at both, or else transistor 182 in soft start circuit 26 has been recently saturated to drive $Q_3$ to "0." Therefore, at least one modulated pulse generator 20 or 21 is regulating the converter output; or the soft start circuit 26 is controlling the converter output. When $\overline{Q_2}$ or $\overline{Q_3}$ is "1," either transistor 201 or transistor 202 is saturated thereby discharging capacitor 205. This discharge, of course, occurs through resistor 209.

Nevertheless, if $\overline{Q_2}$ or $\overline{Q_3}$ are both "0" for a period of approximately 10 cycles, for example, of the oscillator output signal I, capacitor 205 does charge sufficiently to trigger Zener diode 206 and transistor 208 into full conduction. When transistor 208 is turned on, it remains on permanently until switch 51 is opened and then reclosed after at least a period of preselected time, for example 30 seconds, due to decay of input voltage on filter capacitor 71.

We claim:
1. A dc-to-dc converter comprising
an inverter circuit,
means for supplying dc power to said inverter circuit,
means for extracting rectified dc power from said inverter circuit,
means for controlling said inverter circuit to regulate a parameter of said rectified dc power, comprising
means for producing feedback pulses with a time delay inversely related to the value of said parameter,
means responsive to said supplying means for generating soft start pulses with increasing time delay after the start of operation of said converter, and
logic means responsive to said feedback pulses and said soft start pulses for transmitting only a first received one of said pulses to change conduction in said inverter circuit in the sense that limits the value of said parameter.

2. A dc-to-dc converter circuit according to claim 1 in which the inverter circuit includes
a pair of switching transistors, and
a transformer having a primary winding connected in a balanced circuit with said switching transistors and said supplying means, said transformer having a secondary winding connected to said means for extracting rectified dc power from said inverter circuit, and
the logic means includes
an oscillator oscillating at a constant frequency and
a circuit connected between said oscillator and said switching transistors to permit said transistors to conduct alternately at a constant turn-on frequency determined by said constant frequency of said oscillator and to turn the conducting transistor off in response to the first received feedback pulse.

3. A dc-to-dc converter circuit according to claim 2 in which
the means for extracting dc rectified power includes a full-wave rectifier and filter interconnected with the transformer secondary winding to provide first and second output lines and an intermediate ground connection
the means for producing feedback pulses includes
first means for sensing the voltage from the first output line to ground,
first means for sensing the current in the first output line,
second means for sensing the voltage from the second output line to ground,
second means for sensing the current in the second output line,
means responsive to said first voltage sensing means and said first current sensing means for generating a first feedback pulse in response to the larger of the deviations of the sensed values from nominal values and with a first time delay substantially inversely proportional to said larger deviation, and means responsive to said second voltage sensing means and said second current sensing means for generating a second feedback pulse in response to the larger of the deviations of the sensed values from nominal values and with a second time delay substantially inversely proportional to said larger deviation.

4. A dc-to-dc converter circuit according to claim 3 in which the means for producing feedback pulses includes first and second pulse transformers coupled between the first and second feedback pulse generating means, respectively, and the logic means.

5. A dc-to-dc converter circuit according to claim 3 in which the logic means includes means for shutting down the inverter circuit when none of the first and second feedback pulses and soft start pulses are received for a prescribed period of time.

6. A dc-to-dc converter circuit according to claim 3 in which the logic means includes isolating pulse transformer means for coupling timing pulses to said first and second feedback pulse generating means.

7. A dc-to-dc converter circuit according to claim 6 in which the first and second feedback pulse generating means includes first and second reference voltage generating means, respectively, first and second means, respectively, for comparing voltage signals of selected proportionability to the sensed voltage and current values received by each generating means with the respective one of the first and second reference voltages to produce first and second larger deviation signals, respectively, first and second means, respectively, coupled to the isolating pulse transformer means and responsive to said timing pulses for producing first and second ramp voltage signals, and first and second means for comprising the respective large deviation signals with the respective first and second ramp voltage signals to yield the first and second time delays terminating at the times of equality of the compared sigals.

8. A dc-to-dc converter circuit according to claim 1 in which the logic means comprises an oscillator oscillating at a constant frequency, and a logic circuit coupled between the oscillator and the inverter circuit and characterized by a pair of connections to said inverter circuit, said logic circuit including three bistable multivibrator circuits and a pair of NOR gates interconnected to halve the frequency of said oscillator and provide substantially out-of-phase signals at the halved frequency on said connections to said inverter, and means coupling feedback pulses into two of said multivibrators to provide time-variable resetting thereof during each half cycle of the halved frequency, the means for producing feedback pulses including timing ramp signal circuitry for providing a variable time offset of said feedback pulses in response to at least one variable condition of the extracted dc power of said converter.

* * * * *